United States Patent [19]
Cox

[11] 3,783,366
[45] Jan. 1, 1974

[54] DUTY CYCLE CONTROL SYSTEM
[75] Inventor: Harold Autrey Cox, Richardson, Tex.
[73] Assignee: Texas Instruments Incorporated, Dallas, Tex.
[22] Filed: Aug. 13, 1971
[21] Appl. No.: 171,673

[52] U.S. Cl............................ 321/5, 321/18, 321/40, 321/47
[51] Int. Cl. ............................................. H02m 7/12
[58] Field of Search ...................... 321/5, 18, 38, 40, 321/42, 47; 307/252 UA; 323/17; 219/10.77

[56] References Cited
UNITED STATES PATENTS

| | | | |
|---|---|---|---|
| 3,497,794 | 2/1970 | Fredrickson et al.................. | 323/17 |
| 3,624,486 | 11/1971 | Oates.................................... | 321/18 |
| 3,177,336 | 4/1965 | Fischer ............................ | 219/10.77 |
| 3,633,094 | 1/1972 | Clements ..................... | 307/252 UA |
| 2,539,786 | 1/1951 | Ussman................................ | 321/40 |
| 3,281,645 | 10/1965 | Spink .................................... | 321/47 |
| 3,465,234 | 9/1969 | Phadke ............................ | 321/18 X |

FOREIGN PATENTS OR APPLICATIONS

| | | | |
|---|---|---|---|
| 66,215 | 9/1969 | Germany................................ | 321/5 |

*Primary Examiner*—Gerald Goldberg
*Attorney*—Harold Levine et al.

[57] ABSTRACT

A closed loop control system for controlling the average output of a generator or other device. The output is detected and the detected signal is applied to a summing point at which it is summed with an externally supplied control signal. The summed signal is integrated and applied to a Schmidt Trigger, the output of which is coupled through control logic to control the generator. The generator duty cycle is controlled to maintain a desired average output. In a specific embodiment wherein the average output of a three phase converter supplying D.C. to the generator is controlled, at each duty cycle the converter is turned on at an initial reference potential crossing point and thereafter the output is a function of the difference between the most positive and the least positive phases.

5 Claims, 9 Drawing Figures

INVENTOR
Harold A. Cox

BY
ATTORNEY

DUTY CYCLE CONTROL SYSTEM

This invention relates generally to control systems and more particularly to control systems for controlling the duty cycle of devices which are alternately turned on and off or otherwise alternately switched between two states.

One approach that has been used to control the duty cycle of devices which must be alternately turned on and off for desired operation is to alternately turn the device on and off at predetermined intervals, as under clock control. In thermal systems a common approach is to use a thermostatic switch which turns the device off when a predetermined maximum level is reached and turns it back on again when a predetermined minimum is reached. However, there is apparently no known closed loop control system for controlling an average device output level by controlling the device duty cycle.

Accordingly, a specific embodiment of the invention comprises a closed loop control system for controlling the duty cycle of a radio frequency generator used for induction heating in a Czochralski crystal puller, thereby controlling the average generator output and maintaining the temperature of the molten silicon constant as specified by a control signal. Changing the value of the control signal, e.g., under computer control, will change the average generator output and hence change the melt temperature.

The basic control system of this invention comprises a closed loop system wherein a control signal which indicates the desired average generator output required to maintain a specified fixed melt temperature is summed with the detected RF output of the generator, integrated and applied to a Schmidt Trigger, the output of which is applied to control logic which controls the AC-DC converter of the generator. The generator is on only during the logic one output state of the Schmidt Trigger. As the logic state of the output of the Schmidt Trigger is dependent on the magnitude of the input waveform, the generator duty cycle is dependent on the integration of the summed control signal and detected actual generator output. Integration enables the desired average generator output to be maintained, even though intermittent time delays may be incurred within the system. The closed loop system is immune from effect by power supply fluctuations and other external variables, and hence maintains a stable, fixed output level while on, which in turn maintains a stable desired melt temperature.

It is a significant feature of the control system of this invention that each generator period is of a practically usable length regardless of the value of the desired duty cycle. According to some control schemes, the pulse width decreases as the duty cycle is decreased. Such a control scheme cannot be utilized to control device (e.g., including heating generator) for which both on and off periods must be of appreciable length regardless of their relative proportions. Accordingly, in the system of this invention the device period is a usable minimum when the duty cycle is 0.5, and increases as the duty cycle approaches zero or one.

In a more specific aspect of the invention, the control logic controls the three phase converter power supply circuit of the generator to control the supply voltage to the converter, and hence control the generator output. When the Schmidt Trigger output changes to a logic one, the converter is turned on only upon occurrence of an initial zero crossing of two of the phases, thus avoiding the introduction of impulse functions on the system power lines. Thereafter the converter output is a function of the difference between the two phases having the largest and smallest potential, respectively until the Schmidt Trigger output changes to a logic zero and the generator is shut off.

It is a broad object of the invention to provide a closed loop control system for controlling the duty cycle of a two-state device.

It is another object of the invention to provide a control system for maintaining a desired average output level of a generator.

It is another object of the invention to provide a control system for maintaining a desired average output level of a radio frequency generator powered by a three phase supply.

It is yet another object of the invention to provide a control system for maintaining a constant melt temperature in a Czochalski crystall puller.

Other objects and advantages of the invention will become apparent from the following detailed description in conjunction with the drawings, in which.

Figure 1:
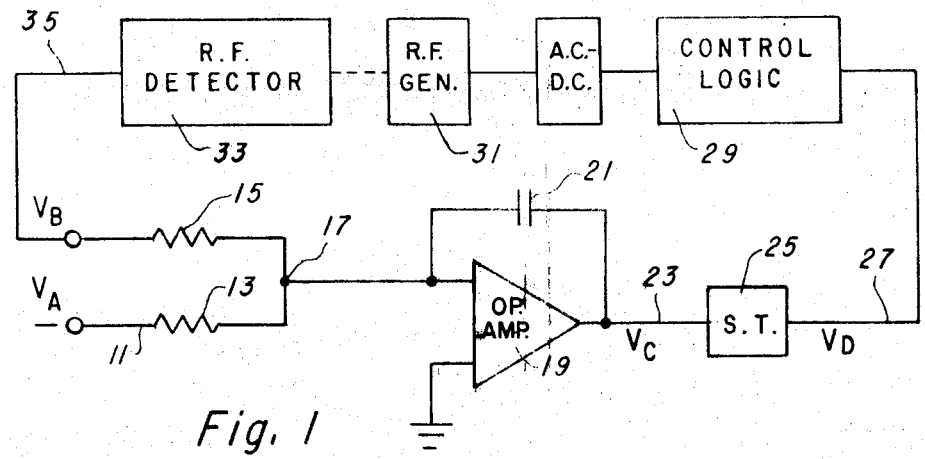
FIG. 1 is a block diagram of a preferred control system.

A basic control system of this invention is illustrated in block diagram in FIG. 1. The closed control loop basically comprises a summing point 17, an integrator 19, a Schmidt Trigger 25, control logic 29, radio frequency (RF) generator 31 powered by a three phase AC-DC converter 30, and RF detector 33. This embodiment is employed to control the average output of radio frequency generator of the type employed for RF induction heating, as in Czochralski crystal pullers. It should be particularly noted that the teachings of this specification are not limited to the particular implementation disclosed.

The RF generator 31 is alternately turned on and off in order to maintain a desired average output. The control system of FIG. 1 controls the generator duty cycle, i.e., the period of time during which the generator is on, in order to control the average generator output. A voltage indicative of the desired average generator output is coupled to summing point 17 through resistor 13. This voltage is summed with the detected actual generator output, detected by RF detector 33, which is coupled through resistor 15 to a summing point 17. The summed voltage is connected as an input to integrator 19. The integrator 19 comprises an operational amplifier having a capacitor 21 connected thereacross. The output of the integrator 19 is connected by line 23 to a Schmidt Trigger 25, the output of which is connected by line 27 to control logic 29. Control logic 29 alternately turns the converter of the RF generator on and off in order to provide the desired average output level.

The RF detector 33 continuously monitors the actual output level of RF generator 31.

It may be noted that in the control system of FIG. 1 the control loop may be closed by applying the Schmidt Trigger output, or a calibrated function thereof, directly through the resistor 15 to summing point 17, as well as to control logic 29. In that arrangement of the RF detector 33 is not required. However, such a system will not be immune from such external variables as power supply fluctuations in the RF generator caused by line voltage variations. Thus a more stable generator output is obtained by continuously detecting the actual output and applying the detected output through resistor 15 to summing point 17.

Figure 2:
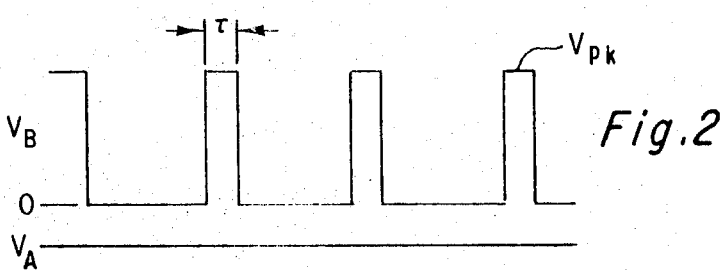
FIGS. 2-4 are diagrams of signal waveforms from the system of FIG. 1.
Figure 3:
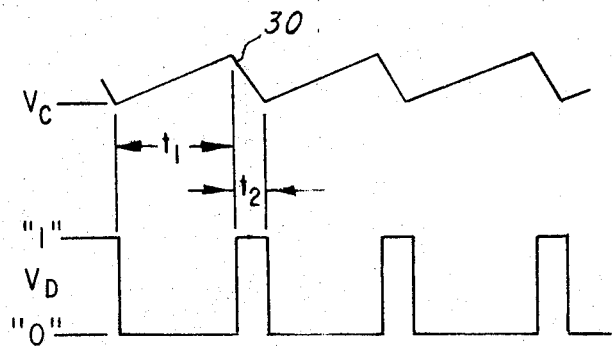

Voltage $V_A$ is indicative of the desired average generator output level. As illustrated in FIG. 2, voltage $V_A$ is a d.c. voltage. The d.c. voltage $V_A$ may be changed at any given time in order to change the desired average generator output, either by manual control or by computer under direct digital control. The RF voltage output of the generator, which is detected by RF detector 33, is indicated by waveform $V_B$ in FIG. 2. Voltage $V_B$ varies in a square wave relationship from zero potential to a maximum potential $V_{pk}$. Thus the waveform $V_B$ illustrated in FIG. 2 indicates that the generator is on only during time period $t_2$. During this time period the input $V_C$ of the Schmidt Trigger has a negative slope and its output $V_D$, is at logic "1". At all times when the generator is on, the output level thereof is a d.c. voltage $V_{pk}$. The control voltage $V_A$ is negative with respect to the reference potential Output waveform $V_C$ of integrator 19 is illustrated in the top portion of FIG. 3. Sawtooth waveform $V_C$ is input to a conventional Schmidt Trigger 25. A Schmidt Trigger has a logic output which is in either a logic one or logic zero state at all times. The state of the output signal $V_C$ of the Schmidt Trigger 25 depends on the magnitude of input waveform $V_C$. The Schmidt Trigger 25 triggers when $V_C$ peaks and thus, the output level of the Schmidt Trigger is a logic one while the slope of $V_C$ is negative. It again triggers when $V_C$ reaches a minimum, and thus the Schmidt Trigger output is a logical zero while the slope of $V_C$ is positive.

The sawtooth shape of the input waveform to Schmidt Trigger 25 actually results from the closed loop operation. A Schmidt Trigger produces a logic one when an upper trip point voltage is reached or surpassed, and produces a logic zero when a lower trip point voltage is reached. During the portion of a generator cycle when the generator is off, only the negative control voltage appears at the integrator input, and thus the integrator output is an increasing ramp. When this ramp reaches the upper trip point, the Schmidt Trigger is triggered to produce a logic "1," which turns the generator on. While the generator is on, the integrator input is the net positive difference voltage between the positive generator output and the negative control voltage, and thus the integrator output is a decreasing ramp. When this ramp decreases to the lower trip point, the Schmidt Trigger is triggered to produce a logic "0" which turns the generator off.

Figure 4:
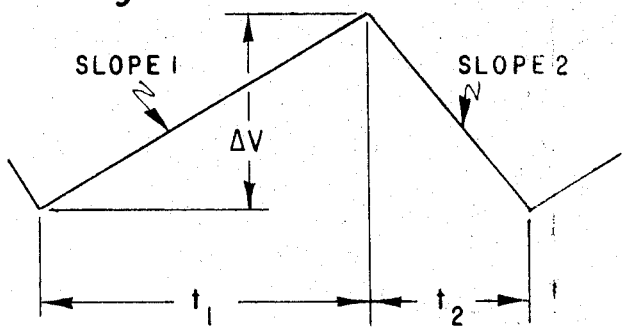

The manner in which the duty cycle of the generator is controlled will now be explained in more detail with reference to FIG. 4, which illustrates an isolated pulse of the waveform $V_C$. During the time period $t_1$, the RF generator output is zero and thus the only voltage present at the input of integrator 19 is the negative d.c. voltage $V_A$. Thus the slope of the waveform $V_C$ at the output of integrator 19 during this period is equal to the voltage $V_A$ divided by the time constant $RC$ of the integrator, wherein resistor 13 and 15 are of value $R$ and capacitor 21 is of value $C$. Thus, the time period $t_1$ is given by the following equation:

$$t_1 = \Delta V RC/V_A$$

wherein $\Delta V$ is the difference between the minimum and maximum levels of waveform $V_C$. During time period $t_2$, the RF generator has an output $V_{pk}$, and thus the slope of this portion of the waveform is equal to the voltage $V_A$ minus the voltage $V_{pk}$, divided by the time constant. Thus, the time period $t_2$ is given by the following equation:

$$t_2 = \Delta V RC/(V_{pk} - V_A)$$

The total period of each pulse of the waveform $V_C$ is equal to $t_1$ plus $t_2$, as given by the following equation:

$$t_1 + t_2 = \frac{\dfrac{\Delta V RC}{V_{pk}}}{\left(1 - \dfrac{V_A}{V_{pk}}\right)\dfrac{V_A}{V_{pk}}}$$

The duty cycle $\tau$ during which the generator is on is equal to time period $t_2$ divided by the total period $t_1 + t_2$ of the pulse, which reduced to the following equation:

$$\tau = V_A/V_{pk}$$

Thus, the duty cycle of the generator is equal to the ratio of the control voltage $V_A$ to the peak generator output $V_{pk}$.

Figure 5:
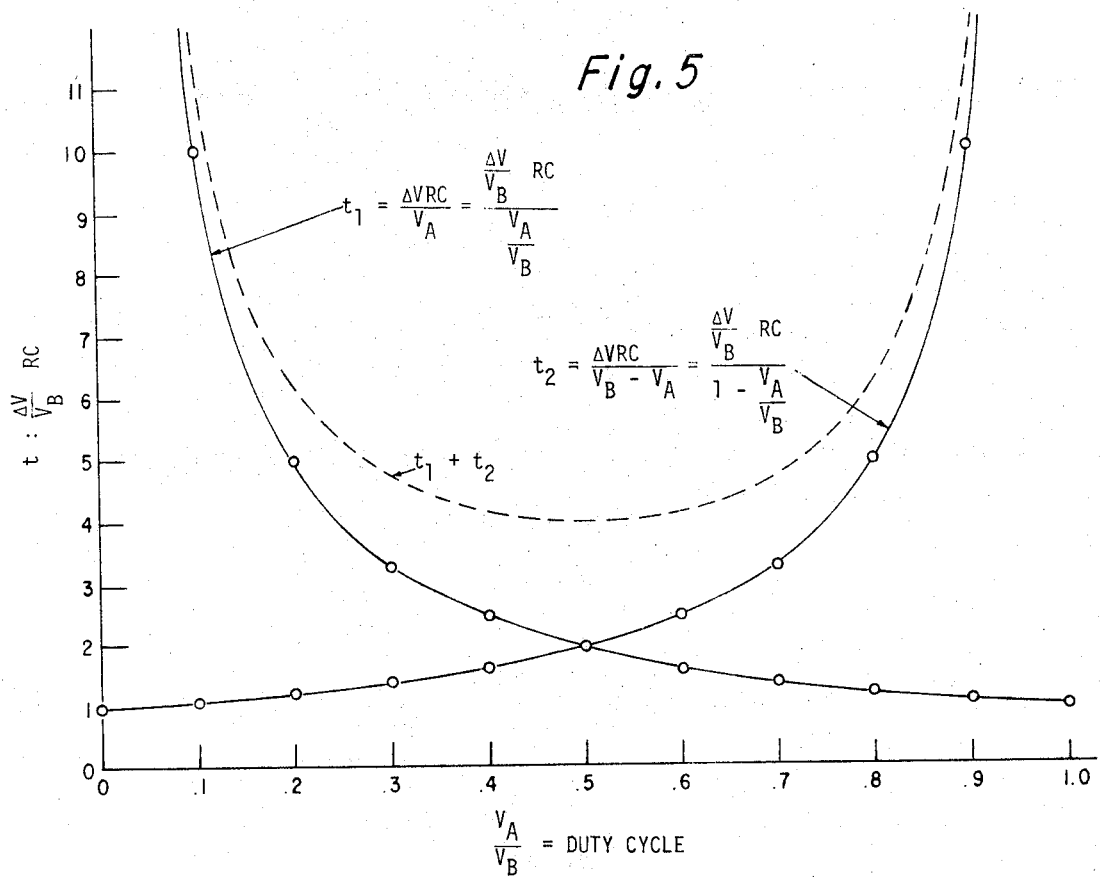
FIG. 5 is a plot of pulse period as a function of the generator duty cycle.

FIG. 5 is a plot illustrating the period of the generator pulse as a function of the duty cycle. The abscissa in FIG. 5 is the duty cycle and the ordinate is actual time t normalized by the constant $\Delta V RC/V_{pk}$. The time periods $t_1$ and $t_2$ are plotted for duty cycles of from zero to one. The sum of these two time periods is the generator period and is represented by the curve $t_1 + t_2$. Thus, the period of each cycle of voltage $V_C$ is a minimum when the duty cycle is 0.5 and increases as the duty cycle approaches zero or one. The actual time value of the minimum period is a function of circuit constants $R$ and $C$, and can be increased by increasing the values of $R$ and $C$. Thus a usable period may be obtained for any value of duty cycle.

Figure 6:
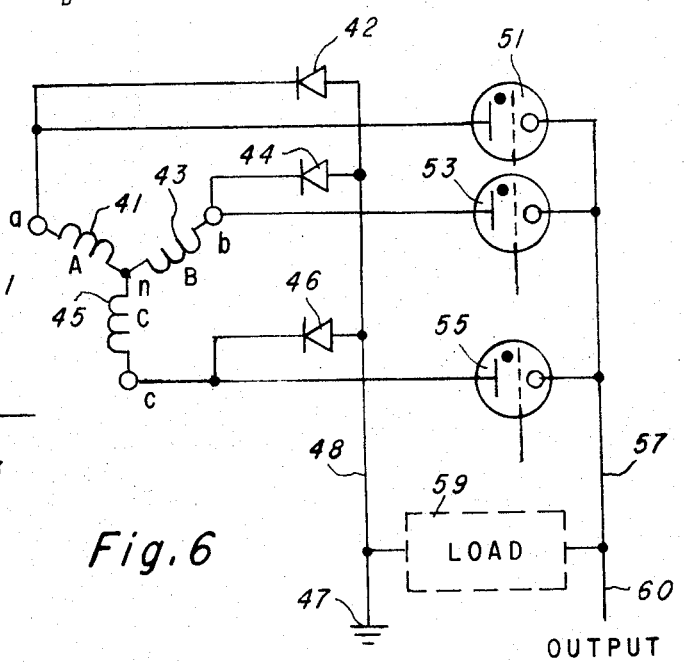
FIG. 6 is a schematic diagram of the three phase converter power supply circuit of the generator.

The power supply portion 30 of an RF generator 31 employed in an embodiment of this invention is illustrated in FIG. 6. A transformer having secondary windings 41, 43, 45 has primary windings (not shown) connected to the line voltage. Each of the phases A, B and C of the transformer is coupled through a diode to the reference voltage. Each phase is also connected to the anode of a thyratron, the cathodes of which are coupled to supply power voltage to the generator designated generally as load 59. Phase A is coupled through diode 42 to reference potential 47; phase B is coupled through diode 44 to reference potential 47; phase C is coupled through diode 46 to reference potential 47. Phase A is coupled to the anode of thyratron 51; phase B is coupled to the anode of thyratron 53; phase C is coupled to the anode of thyratron 55. The center n of the Y-wound transformer is not connected to the reference potential.

The cathodes of all three thyratrons are connected to a common line 57, which carries the voltage furnished to the generator which in turn determines the RF power supplied by the generator. The tyratrons basically function as switches having an output which is a function of the input, but have a diode characteristic such that they are biased off in the reverse bias mode. After the generator is turned on, when the potential of any one of the phases A, B or C becomes greater than the others, the thyratrons connected to the other two phases are reverse biased off. Thus, the output on line 57 is determined by the most positive of the voltage phases at any given time. The most negative (i.e., least positive) of the phases A, B and C at any given time is coupled to reference potential 47. Therefore, the voltage potential supplied to load 59 is the difference between the most positive phase and the most negative phase at any given time.

Figure 7:
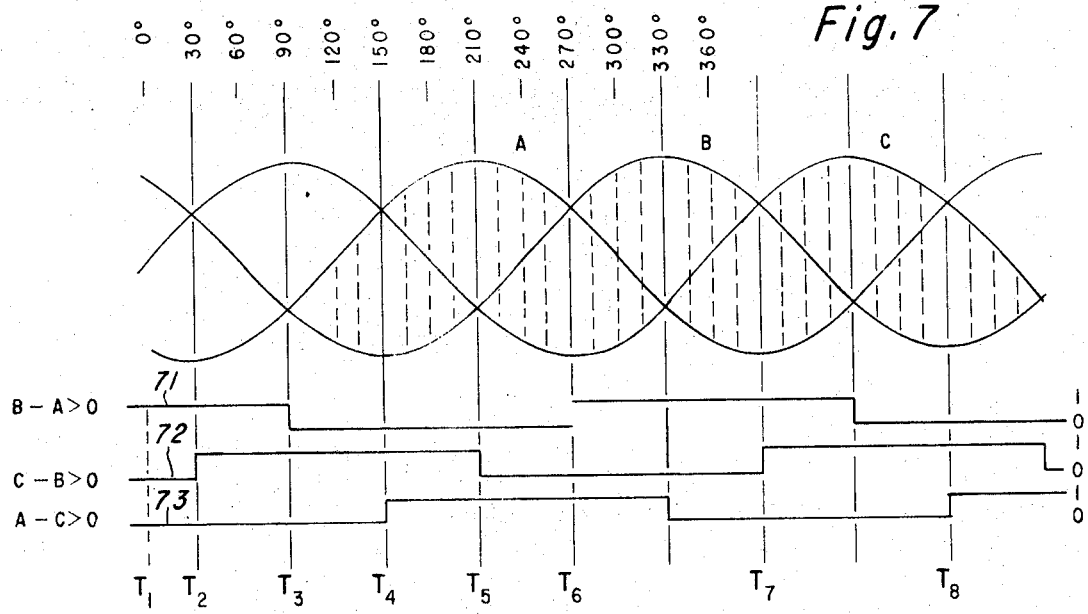
FIG. 7 is a signal waveform and level comparison of the supply phase.

Controlled operation of the RF generator is further illustrated in connection with the timing diagram of FIG. 7. Sinusoidal waveforms A, B and C correspond to the respective voltages $V_{a-n}$, $V_{b-n}$, and $V_{c-n}$ on the secondary windings of the transformer of FIG. 6. The difference between the most positive and most negative phases, indicated by the dashed lines, is the supply voltage furnished to the generator converter and is approximately a d.c. voltage. In order to prevent the introduction of voltage spikes on the power suppoy lines as the generator is turned on, turning on of the converter is synchronized to occur at zero crossing points (i.e., reference potential crossing points) of two phases. Waveform 71 is a logical diagram of the function $B-A>0$. Similarly, waveform 72 is a logical diagram of the condition $C-B>0$, and waveform 73 is a logical diagram of condition $A-C>0$. A logical "1" indicates that the condition is true and a logical "0" indicates that it is false. Prior to time point $T_3$, the potential of phase B is more positive than phase A so that waveform 71 is a logical "1." At time point $T_3$, the phase A potential becomes more positive than the phase B potential and waveform 71 incurs a transition to the logical "0" state. The transition from a logical "1" to a logical "0" will be referred to hereinafter as a trailing pulse edge. Prior to time point $T_4$, the potential of phase C is more positive than the potential of phase A such that waveform 73 is in the logical "0" state. At time point $T_4$, waveform 73 undergoes a transition to a logical "1" state as a result of the waveform C potential becoming less positive than potential A. Each transition from a logical "0" to a logical "1" will be referred to hereinafter as a leading pulse edge. Between time periods $T_2$ and $T_5$ the potential of phase C is more positive than the potential of phase B and thus waveform 72 is a logical "1." At time point $T_5$, waveform 72 undergoes a transition to a "0" state as a result of waveform B becoming more positive than C.

Figure 8:
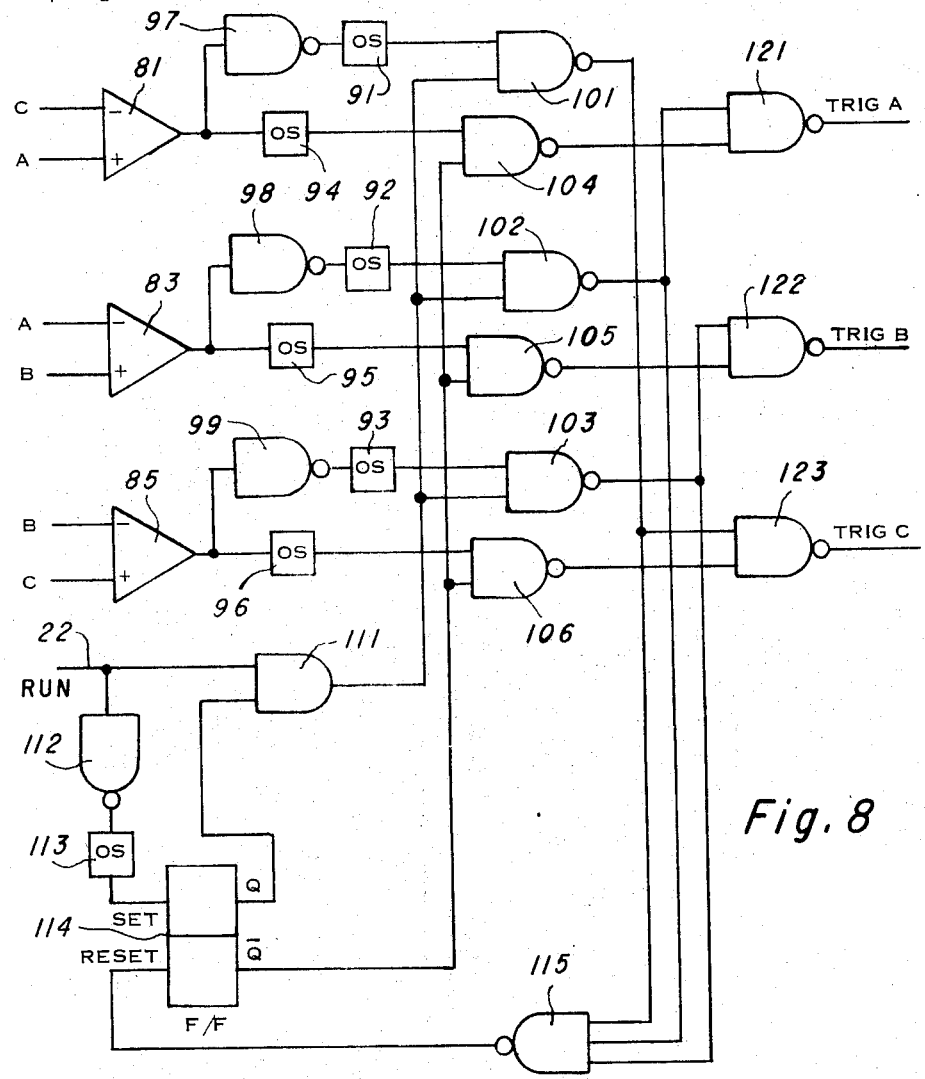
FIG. 8 is a schematic diagram of the control logic.

FIG. 8 is a schematic diagram of control logic 29. Differential amplifier 81 has voltage phase C connected to the negative input and phase A connected to the positive input. Differential amplifier 83 has phase A connected to the negative input and phase B connected to the positive input. Differential amplifier 85 has phase B connected to the negative input and phase C connected to the positive input. Each of the differential amplifiers 81, 83 and 85 are conventional operational amplifiers. The output of each of these amplifiers (logic functions 71, 72, 73) is connected directly to a conventional one-shot multivibrator which provides a logic "1" output upon occurrence of a positive-going waveform transition, or leading edge. Each output is also connected through an inverter to another one-shot multivibrator to provide a logic "1" condition in response to occurrence of a negative-going waveform transition, or trailing edge. Each of the one-shot multivibrators is of conventional design and goes to the logical "1" condition for a short duration of time when triggered, and then returns to the logical "0" condition again. All of the one-short multivibrators illustrated in FIG. 8 provide a logic "1" output when the input waveform undergoes a transition from a logic "0" to a logic "1." The output of differential amplifier 81 is coupled through a multivibrator 94 to the input of NAND gate 104. The other input to NAND gate 104 is connected to the $\overline{Q}$ output of flip-flop 114. The output of differential amplifier 81 is also coupled through inverter 97 and multivibrator 91 to the input of NAND gate 101, the other input of which is connected to the output of AND gate 111. The output of differential amplifier 83 is coupled through multivibrator 95 to the input of NAND gate 105, the other input of which is connected to $\overline{Q}$. The output of differential amplifier 83 is also coupled through inverter 98 and multivibrator 92 to the input of NAND gate 102, the other input of which is connected to the output of AND gate 111. The output of differential amplifier 85 is coupled through multivibrator 96 to the input of NAND gate 106, the other input of which is connected to $\overline{Q}$. The output of differential amplifier 85 is also coupled through inverter 99 and multivibrator 93 to the input of NAND gate 103, the other input of which is coupled to the output of AND gate 111. The output of NAND gate 104 is connected as an input to gate 121, the other input of which is connected to the output of gate 102. The output of gate 105 is connected as an input to gate 122, the other input of which is connected to the output of gate 103. The output of gate 106 is connected as an input to gate 123, the other input of which is connected to the output of gate 101. The output of gates 101, 102 and 103 are all connected as inputs to NAND gate 115, the output of which is connected to the reset input of flip-flop 114.

Operation of the logic circuit of FIG. 8 is initiated by receipt of a logic "1" condition of $V_D$, the output of Schmidt Trigger 25, at AND gate 111. When a logic "1" or "run" signal, is received, AND gate 111 has already been enabled as a result of the coupling of the trailing edge of the prior generator pulse signal through inverter 112 and multivibrator 113 to the set input of flip-flop 114, thus applying a logic "1" condition Q input to AND gate 111.

The output of NAND gate 121 is coupled to the grid of the thyratron 51, which has phase A coupled to its cathode. A logic "1" output of gate 121 turns on, or fires, thyratron 51. Similarly, the outputs of NAND gates 122 and 123 are coupled to fire phases B and C, respectively, of the generator.

Operation of the circuit of FIG. 8 will be explained in connection with the timing diagram of FIG. 7. At time point $T_1$, the condition of signal $V_D$ changes from a logic "0" to a logic "1" (not specifically illustrated) as a result of firing Schmidt Trigger 25. Since the Q output of flip-flop 114 is already in the logical "1" condition, the output of AND gate 111 changes to a logic "1", thus enabling gates 101, 102 and 103. Then, at time point $T_2$, function $C-B>0$ becomes true, corresponding to a leading edge of that signal. This leading edge triggers multivibrator 96, which applies a logic "1" to the input of NAND gate 106. Since the $\overline{Q}$ output of flip-flop 114 is "0" at this time, flip-flop 106 is disabled. Thus, the generators cannot be fired upon receipt of the initial leading edge. Then, at time point $T_3$, signal B-A becomes less than zero. This trailing edge is inverted by inverter 98 and multivibrator 92 applies a logic "1" to NAND gate 102, which has been enabled by the logic "1" output of the AND gate 111. The output of NAND gate 102 changes to a logic "0" and thus changes the output of NAND gate 121 to a logic "1." This logic "1" signal is coupled to fire thyratron 51 by applying a bias to the grid thereof. In this manner, the generator converter can be initially fired only by a trailing edge of one of the signals $B-A>0$, $C-B>0$ or $A-C>0$. At time point $T_4$, a leading edge of signal $A-C>0$ occurs. This leading edge causes multivibrator 94 to apply to a logic "1" to NAND gate 104. Since the logic "1" output of NAND gate 102 has changed the output of NAND gate 115 to a logic "1," the $\overline{Q}$ output of flip-flop 114 is now a logic "1," and thus gate 104 is enabled. A zero output of NAND gate 104 is applied to NAND gate 121 so that the gate is disabled and the output remains a logic "1," and thus phase A continues to control the generator output. Simultaneously, the Q output of flip-flop 114 is changed to the logic "0" condition and thus the output of AND gate 111 is "0," disabling gates 101, 102 and 103. After this point, only leading edges will trigger the thyratrons during the remainder of the generator "on" time.

At time point $T_6$, a leading edge of the signal $B-A>0$ occurs. Thus multivibrator 95 applies a logic "1" to NAND gate 105, the other input of which has been enabled by $\overline{Q}$. A logic "0" output of NAND gate 105 is applied to NAND gate 122, changing the output thereof to a logic "1," thereby triggering thyratron 53. Thus at time point $T_6$ phase B begins to control the generator output. Thyratron 53 remains firing until time point $T_7$ when the leading edge of signal $C-B>0$ occurs. This leading edge triggers multivibrator 96 to apply a logic "1" to NAND gate 106 and thus a logic "0" to NAND gate 123. A logic "1" output of NAND gate 123 then fires thyratron 55, which remains on until time point $T_8$. In this manner, a thyratron is initially fired upon occurrence of a first trailing edge and thereafter the thyratrons are sequentially fired upon occurrence of leading edges of the signals. By initiating generator converter operation only with a trailing pulse edge, voltage impulses are not introduced to the system power lines.

At the end of each generator "on" time the Schmidt Trigger output changes to a logic "0." This trailing pulse edge is coupled through inverter 112 and multivibrator 113 to the set input of flip-flop 114, changing the Q output to a logic "1." Thus AND 111 is enabled for receipt of the next "run" signal.

Figure 9:
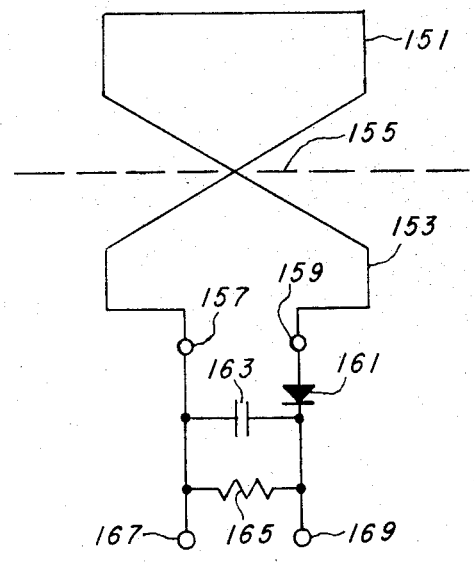
FIG. 9 is a schematic diagram of an RF detector.

FIG. 9 is a schematic diagram of an RF detector employed in a preferred embodiment of the invention. The detector is basically a wire loop antenna twisted into a figure-eight configuration, forming equal loops 151 and 153. The detector is placed adjacent to a conductor which couples the RF generator to the RF induction heating coils in a Czochralski crystal puller, with the conductor positioned on line 155 through the center of the detector. The electric field from the conductor cuts the loops 151 and 153 in opposite directions, inducing voltages which add together. Fields from conductors not equidistant from the two loops tend to cancel because they cut the loops in the same direction.

The voltage induced across terminals 157 and 159 is rectified by diode 161 to produce a d.c. voltage. The resulting d.c. voltage is smoothed by capacitor 163. Shunt load resistor 165 limits the output across terminals 167 and 169 to a desired calibration level at maximum RF. The output of the detector is applied to summing point 17.

Although the invention has been described in connection with a specific embodiment thereof, it is to be understood that the description herein is intended only as illustrative.

What is claimed is:

1. An on-off duty cycle control circuit for an electrical device powered by a d.c. voltage supply derived from a three-phase a.c. voltage source through three-element controlled rectifier devices each of which has an anode connected to one of said three-phase voltages, said circuit comprising:
   a. means generating a two level signal indicative of the on-off state of the electrical device to be controlled,
   b. means generating a second signal of a magnitude indicative of the desired on-off duty cycle of said electrical device,
   c. means receiving said two level signal and said second signal and generating therefrom a summed signal,
   d. means receiving said summed signal and generating an integrated summed signal,
   e. means receiving said integrated summed signal and generating in dependence of the magnitude and slope of said integrated summed signal a control signal of a first magnitude for an "on" period and of a second magnitude for the "off" period of said desired duty cycle,
   f. means receiving said control signal and voltages from each of the three phases of said a.c. source and generating during said "on" period three series of trigger pulses, each of said series for application to the control electrode of a different one of said controlled rectifier devices, each of said trigger pulses being timed to occur when the phase voltage of the anode of the controlled rectifier to which said trigger pulse is to be applied becomes the most positive of the three phase voltages of said a.c. source.

2. A control circuit as defined in claim 1 wherein said last named means further includes means generating an initial trigger pulse during each of said "on" periods for application to the control electrode of the one of said controlled rectifiers whose anode was at the reference voltage of said a.c. source at the beginning of said "on" period, said initial trigger pulse being timed to occur as said anode becomes more positive than said reference voltage.

3. In an on-off duty cycle control circuit for an electrical device powered by a d.c. power supply derived from a a.c. source having phase voltage A, B and C through three-element controlled rectifier devices, each of which has an anode connected to one of said phase voltages, a logic circuit for triggering said controlled rectifier devices comprising:
   a. first, second and third comparator means, said first comparator means having phases A and C as inputs, said second comparator means having phases A and B as inputs and said third comparator means having phases B and C as inputs, the output of each of said comparator means being a square wave signal having leading edges and trailing edges;

b. first, second and third logic means having an enable input and coupled to be responsive to leading edges of, respectively, the first, second and third square wave signals;

c. fourth, fifth and sixth logic means having an enable input and coupled to be responsive to trailing edges of, respectively, the first, second and third square wave signals;

d. seventh logic means coupled to the output of said first logic means and to the output of said fifth logic means, the output of said seventh logic means being coupled to trigger the controlled rectifier device of phase A;

e. eighth logic means coupled to the output of said second logic means and to the output of said sixth logic means, the output of said eighth logic means coupled to trigger the controlled rectifier device of phase B; and f. ninth logic means coupled to the output of said third logic means and to the output of said fourth logic means, the output of said ninth logic means coupled to trigger the controlled rectifier device of phase C.

4. The circuit of claim 3 further comprising means for enabling said fourth, fifth and sixth logic means and disabling said first, second and third logic means in response to a run signal.

5. The circuit of claim 4 further comprising means for enabling said first, second and third logic means and disabling said fourth, fifth and sixth logic means in response to the first-occurring trailing edge.

* * * * *